June 14, 1938.  J. GOOD  2,120,555
AUTOMOTIVE ENGINE CONTROL
Filed March 19, 1934  2 Sheets-Sheet 1

INVENTOR
John Good
BY
ATTORNEYS

June 14, 1938.  J. GOOD  2,120,555
AUTOMOTIVE ENGINE CONTROL
Filed March 19, 1934    2 Sheets-Sheet 2
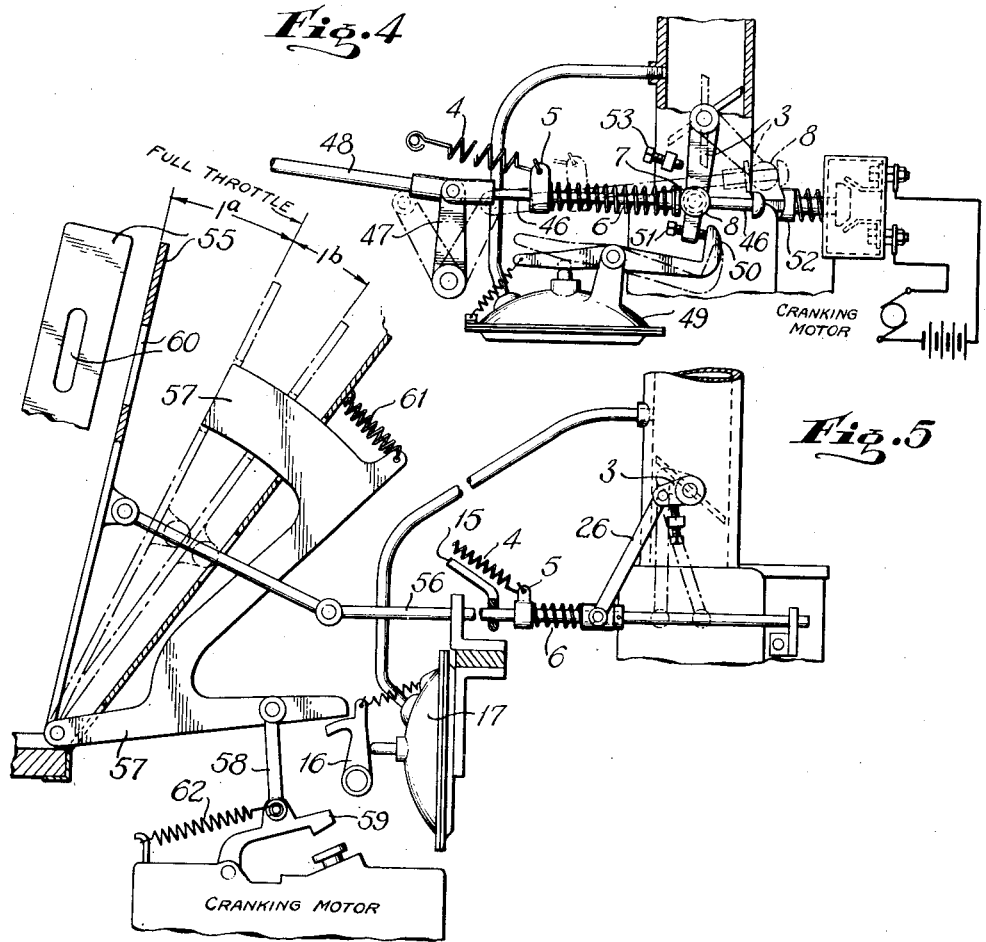
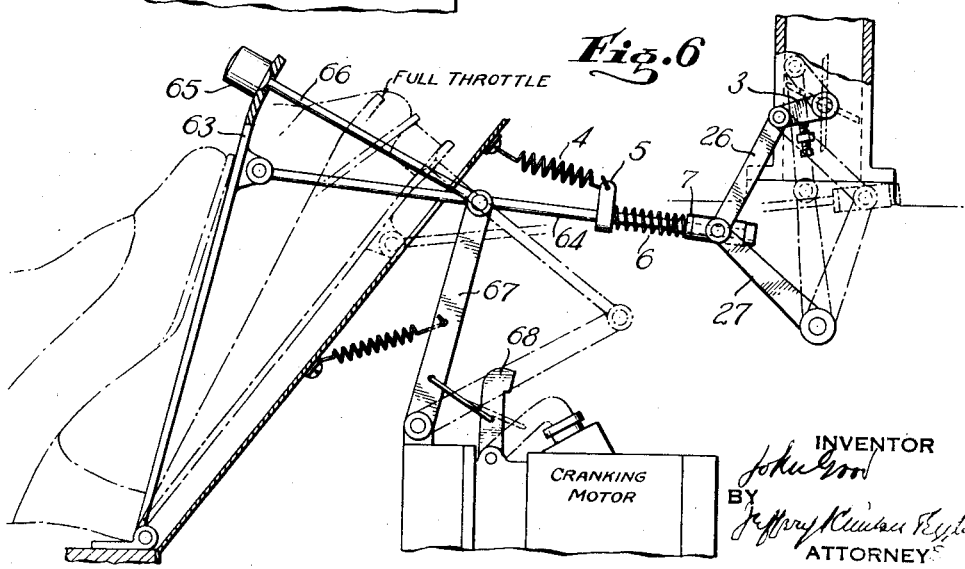

Patented June 14, 1938

2,120,555

UNITED STATES PATENT OFFICE 2,120,555

AUTOMOTIVE ENGINE CONTROL

John Good, Garden City, N. Y., assignor to Automatic Motor Stop and Start, Inc., New York, N. Y., a corporation of New York Application March 19, 1934, Serial No. 716,411

11 Claims. (Cl. 123—179)

Figure 1:
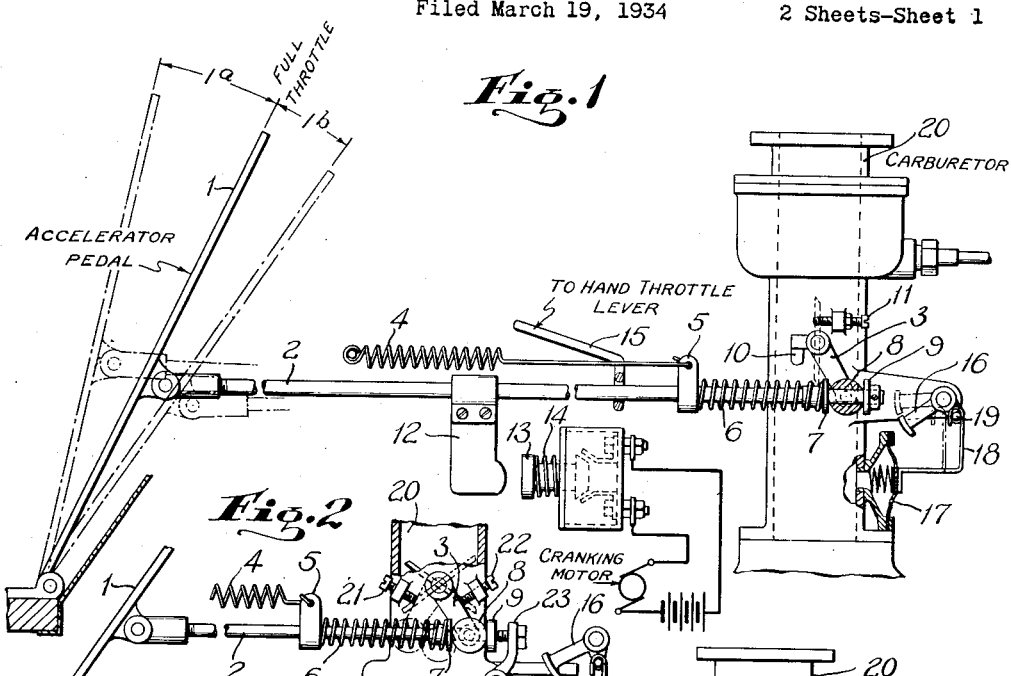

The invention relates to control systems for automotive vehicles and its object is to simplify the work of operating the vehicle and among other things to provide an improved type of dual function control member selectively usable by the driver either for controlling the fuel supply to the engine or for energizing the cranking system or starting motor according as circumstances require but adequately safeguarded against its improper use for cranking the engine. To this end, the invention contemplates an operator's control member, for instance a pedal, having two ranges of movement; namely, an upper range in which it serves to control the car-speed, that is to say, the position of the engine throttle, in any suitable way, and a lower range in which it is used to set the cranking system in action, as by closing the usual starting circuit, these ranges being sufficiently separate or defined one from the other so that there is no likelihood that the engine will be cranked when it is already firing, yet enabling the operator to crank it quickly in case of a stall and with little or no conscious effort on his part. The invention further comprehends a new method of throttle control at starting whether or not employed with a two range pedal or with a dual-function pedal, and it also contemplates other independent novel features in engine control systems which will become apparent in the following description:

In the accompanying drawings, which are diagrammatic merely, Fig. 1 illustrates a control system according to the invention and Figs. 2, 3, 4, 5, 6, and 7 are other forms.

Referring first to Fig. 1, the operator's control member, represented as the conventional automobile accelerator pedal is marked 1, being mounted as usual and connected in any suitable way as by means of a push rod 2 with the crank arm 3 of the engine throttle. The throttle represents any means of controlling the fuel supply to the engine as will be understood, and so far as this invention is concerned the crank arm 3 can be located wherever desirable, whether on the throttle spindle or otherwise does not matter. The throttle is closed by means of the spring 4 connected to the push rod 2 by a clamp 5 fast on the latter, but this spring also may be variously applied. The throttle is opened by the action of the push rod 2 thereon acting through a spring 6, mounted on the push rod between the fixed clamp 5 and the collar 7, which latter abuts against the throttle crank and through which and the crank the push rod may slide. Conveniently the crank is furnished with a swivelled eye 8 to receive the rod and a collar 9 is fixed on the end of the rod to complete the connection to the throttle. Depression of the foot pedal to the extent indicated by the arc 1ª opens the throttle through the spring 6 to its wide open position, which is that indicated by the full lines in the drawings, and in this position the throttle crank is stopped by contact with an abutment 10. Reverse movement of the pedal and push rod 2, under the pull of spring 4 returns the throttle to its closed or normal adjustment for idling, regulated as usual by an idling screw 11, or equivalent device. This movement of the pedal is its primary or upper range used for controlling the fuel supply and hence the vehicle speed.

By depressing the pedal beyond the full-line position, into its lower range represented by the arc 1ᵇ, it advances the push rod further, sliding it through the collar 7 and eye 8 and compressing the spring 6, until the finger 12 which is clamped on or otherwise connected to the push rod or pedal comes into operating relation to the cranking device 13. The latter, diagrammatically shown, represents any suitable type of engine-starting system. It may be a simple switch as shown, the circuit of which is closed by the depression of the plunger 13 against the action of its spring 14. Release of the foot pedal, when the engine fires, allows the spring 4 to close the throttle to the idling position fixed by the idling screw 11, or to the position fixed by the hand throttle control 15. This latter is indicated as sliding on the push rod 2 so as to thrust against the clamp 5 to open the throttle, but is not affected by the action of the foot pedal. It can obviously be used for all the purposes the pedal may be used for, if desired.

The illustrated connections between the operator's control member or members and the engine throttle and cranking device represent merely one of many possible overrunning linkage systems that could be used with like effect and it will be understood are subject to extensive variation to conform to different makes of automobiles. The simple structure shown in Fig. 1, as well as in the other figures, will therefore be taken to be exemplary only.

Use of the accelerator pedal in the upper range for the normal control of the fuel system is done merely against the tension of the light return spring 4, but movement of the pedal into the lower or secondary range 1ᵇ requires that the tension of spring 6, and presently that also of the spring 14 on the cranking device be also overcome. This increase in the resistance to be overcome marks the separation between the two ranges and is ordinarily sufficient to guard against any accidental operation of the cranking device when the engine is firing. However, a further and positive safeguard against the untimely use of the cranking circuit is possible and is contemplated by this invention where such safeguarding is considered desirable. To this end there is shown in Fig. 1 an engine-controlled preventer device in the form of a lock or latch 16, which, when the engine is firing, holds a position as indicated by the dotted lines in Fig. 1 directly in the path of the second range movement of the push rod 2, so as to block any movement of the accelerator pedal (or hand throttle) into that lower range. But this latch drops out of the way when the engine is dead, thus permitting it to be restarted. The blocking device is illustrated, for example merely, as controlled by the suction condition in the intake manifold as by means of a metallic bellows or diaphragm 17, subjected to such suction and connected through its bracket arm 18 with a crank arm 19 on the latch. The operation will be apparent and it will be apparent also that any other means of using some variable function of the engine, mechanical or electric, to block or guard against the untimely use of the cranking motor will suffice in place of the prevention means shown.

In this form of the invention the throttle of the down draft carburetor 20 is wide open when cranking occurs and gives a reliable start. It does not result in engine-racing because the operator will instinctively release the foot pedal the instant the engine picks up.

Figure 2:
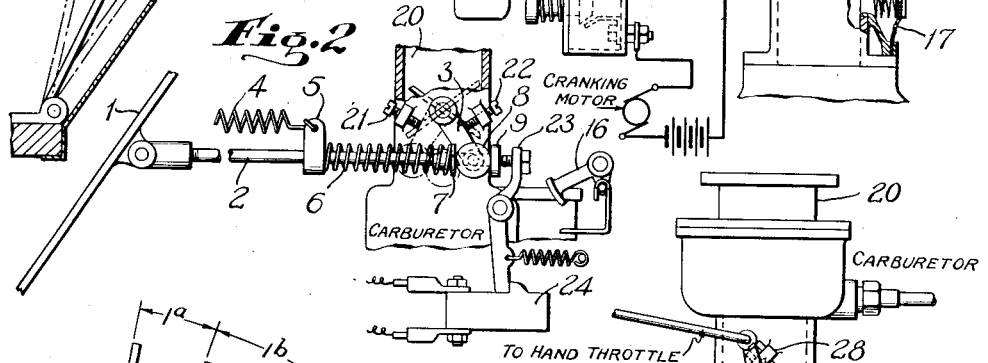

Within the invention, however the throttle can be at any desired partially closed position during the cranking, and an arrangement to produce this effect is shown in Fig. 2. According to this form, the accelerator pedal 1, as before, has an upper or primary range for speed control and a secondary or lower range for cranking. It is connected by push rod 2, collar 5 and spring 6 to the swivelled eye 8 of the throttle crank, which eye is located, as before, between the sliding collar 7 and the fixed collar 9 so that the pedal opens the throttle and the throttle spring 4 closes it to the idling adjustment screw 21. The initial depression moves the throttle to the wide open position. Further depression moves it beyond that position, closing the gas passageway, until the throttle strikes the limit screw 22. At about the same time, the end of the push rod actuates the lever 23 of the starter switch 24, sliding if necessary through the swivelled eye 8 for that purpose. The relatively long stroke thus provided in the second range tends to forestall any possibility of unintentional actuation of the starting switch, but a preventer latch such as indicated at 16, in Fig. 1 and also in Fig. 2, may also be employed in this form if desired. Inasmuch as the one continuous movement of the pedal first opens and then closes the throttle and the engine is thereby reduced in speed as the rod approaches the cranking device, there is little chance of injury from a premature cranking, in any event.

Figure 3:
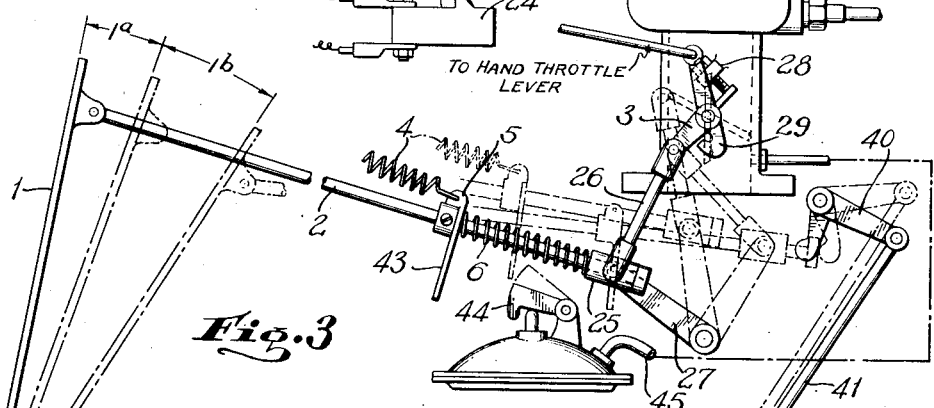

In Fig. 3 the same general design of push rod connection is also used for illustration. The sliding collar, here marked 25, is connected by a link 26 with the throttle crank 3 and is also supported and guided by a carrier member or link 27, the two links constituting a toggle. When these links occupy the retracted position shown in full lines the throttle is closed against the idling screw 28 by the tension of spring 4. When the pedal is depressed to the point where the link 26 holds a dead center relation to the throttle crank the throttle is wide open and this marks the limit of the normal or primary range of the pedal. Pedal movement beyond that point into the secondary range, collapses the links in the reverse angle closing the throttle in the reverse direction until the throttle crank comes again against the idling screw or against a movable abutment represented by the end of the hand-throttle lever 29. At or about this time the end or head of the push rod 2 will be engaged with, or ready to engage with, the bell crank 40 which is connected by pull rod 41 with the starter mechanism or pinion shift lever 42. Still further movement, if necessary, overruns the push rod 2 through the collar 25 compressing the spring 6 against the latter and moving, or further moving the bell crank.

As in the preceding forms the length of stroke available for the secondary range of the pedal is so considerable that positive blocking means are not necessary to prevent untimely actuation of the bell crank 40, but such means can be provided if desired and are indicated as comprising an arm 43 fixed on some convenient point of the linkage system and adapted to be blocked in its movemen, at or beyond the wide open throttle position, by a diaphragm-controlled latch 44 operated by engine suction through tube 45 or otherwise. The position shown is that in which the engine is not firing. The pedal movement in the secondary range is also adequate for that type of engine-cranking mechanism wherein the starter pinion is shifted by the operator's foot movement as indicated by Fig. 3, but shorter strokes in either range are obviously possible by appropriate selection of centers and leverage ratios. The involuntary increase of the fuel supply coincident with the release of the pedal is an effective aid in the starting process.

The overrunning connection between foot pedal and throttle has an independent advantage in respect to dual-function pedals in the fact that its overrun movement can be made to occur in different paths, the one serving wholly for throttle control and the other primarily for cranking the engine as illustrated by Fig. 4. Here the push rod 46 is arranged to slide as before in the eye 8 on the end of the throttle crank (or on any crank in the fuel system) and acts on such crank through its spring 6 and collar 7, being spring retracted by spring 4 as in Fig. 1. The rear or pedal end of this rod is carried on a carrier link 47 or equivalent support and the forward end of the rod moves normally in a curved path in controlling the throttle. The carrier link 47 will be understood to be connected to the foot pedal by a rod such as 48. When the engine is dead the absence of suction on diaphragm 49 allows the spring-controlled latch 50 to take its upper or full line position in which it arrests the forward or opening movement of the throttle crank at some predetermined point, controlled by adjustment of set screw 51. With the crank in this arrested position continued depression of the pedal overruns the end of the rod 46 in nearly a straight line path into operative engagement with the cranking device 52, compressing spring 6 the meantime. When the engine suction has become manifested on the diaphragm, the latch is removed from the path of the crank and on the next ensuing advance of the push rod, the latter is guided by the crank to work in its normal path to and from the dotted line position, entirely escaping the cranking device. The latch 50 can be so designed or angled that it will release the spring-pressed throttle crank as soon as the engine suction develops, in which case a momentary increase of the fuel supply will occur as in Figs. 2 and 3 directly after the engine fires. The contact surface of the cranking device 52 can be concaved or shouldered as indicated in order that there shall be no, or but very little increase of fuel supply until the foot pressure is released or as the foot is withdrawn. The adjustment of the set screw 51 is correlated to that of the normal idling screw 53 so as to give any desired throttle adjustment for the cranking.

A pedal having the lower or secondary range with its described throttle connections can be utilized also with advantage in a further type of control system wherein the accelerator pedal is however physically distinct from and unconnected with the cranking mechanism. Fig. 5 illustrates such a system. The accelerator pedal 55 is connected by linkage or push rod 56 to the link 26 of the throttle crank 3, and the starter foot button 57 is connected by push rod 58 to the (pinion shifter) cranking device 59. The accelerator pedal 55 and foot button 57 are separate levers on a common axis but mutually related so that both can be operated by the foot of the operator. Preferably the top of the button occupies the slot 60 in the pedal only when the latter has been depressed to its full throttle position indicated by the arc 1ª. As the slot is then directly under the operator's foot, further pressure by the latter moves both the pedal and the button down to the floor board. For normal operation the operator controls the throttle by using the pedal 55 in the usual way depressing it only to its full throttle position. This represents the primary range of the pedal, arc 1ª. For starting, the further depression into the lower range or arc 1ᵇ, advances the throttle connections beyond the full throttle or dead center position of link 26 and also the foot button 57 to the point where lever 59 energizes the cranking motor. Due to passing the dead center and the overrun of the rod in link 26 the throttle will be in a partly closed position when the starting circuit is closed. This form can have all the several adjustments of the other forms, as desired including also a preventer device such as indicated at 16 controlled by a diaphragm 17 already described, this for positively blocking the use of the starting button 57 when the engine is firing, but the tension of spring 61 added to that of spring 62 combined with the reduced fuel supply in the lower range will ordinarily suffice to prevent injury from accidental cranking action, without such preventer. Its presence is therefore optional.

A further adaptation of the double action or overrun throttle principle is shown in Fig. 6 wherein the accelerator pedal 63 is connected by linkage or push rod 64 to the toggle links 26 and 27 of the throttle crank 3 similar to the structure of Fig. 3 and the starter foot button 65 is connected by push rod 66 and lever 67 to the cranking device 68. The accelerator pedal and foot button are separate members but mutually related so that both can be operated by the same foot of the operator; preferably the button is located at or in the upper end of the foot pedal, just above the toe of the operator's foot in its normal driving position, in which position he controls the speed of the car in the usual way, opening the throttle up to its full open position corresponding to dead center position of the toggle links, this representing the primary range of pedal stroke. For starting, the foot is slightly raised on the pedal so as to cover also the foot button 65 and then pressed down. This carries the pedal and its throttle connections to and beyond their dead center position and also the starter connections to the point where lever 68 energizes the cranking motor. Due to the overthrow and reverse movement of the throttle crank the throttle itself will be in a partly closed position at such time, suitable for cranking and on the release of the foot all the parts will be restored to normal position under the pull of the several springs indicated, the throttle passing through its wide open position in such return with the effect above referred to. The spring 6 in this form as in the others permits the push rod to slide through the collar 7, but its function in this case is merely to guard against putting excessive strain on the idling screw 61 during starting.

Figure 7:
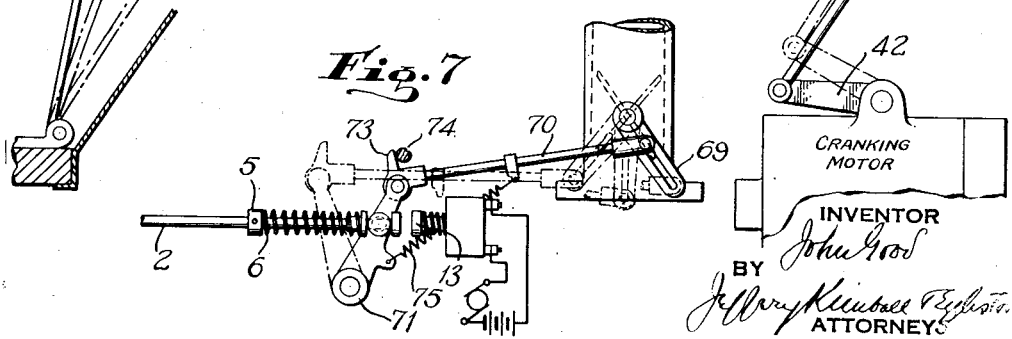

When it is desirable for certain types of carburetors or for other reasons to insure that the throttle shall be promptly adjusted to a particular partially closed position at the moment of cranking the overthrow type of throttle actuator above described can be modified for that purpose as by the arrangement exemplified in Fig. 7 in which the throttle-connected crank 69 is slotted and operated by a bell-crank lever 70 slidingly pinned in the slot at one end and pivoted at the other in a lever type carrier 71 operated by push rod 2 through an overrun spring 6 working as before. When the push rod has advanced the throttle crank to or just beyond the full throttle position, the short arm 73 of the bell crank link 70 encounters a fixed stop 74 which throws its throttle end upwards in the slot against the pull of the spring 75 and instantly throws or cams the throttle crank to the limit of its arc as indicated by the full lines.

It will be understood that the several forms of this invention above described have been shown merely by way of exemplification of the principles involved and without limitation to any of such forms except as required by the appended claims.

I claim:

1. In an automotive engine control system, the combination with a foot pedal at the operator's station, an engine throttle, operating connections between said pedal and throttle, said connections successively opening and closing said throttle by a single depression of the pedal and means at the operator's station to limit the extent of such throttle closure.

2. In an automotive engine control system, a control member for varying the fuel supply, a throttle successively opened and closed by continuous movement in one direction by said member, and operating connections between said member and throttle producing a quicker closing than opening of said throttle.

3. In an automotive engine control system, the combination with the engine throttle of an accelerator pedal having yielding overrunning connections for opening said throttle, an engine cranking device, and means whereby said device is actuated by said connections in their overrun position.

4. In a control system of the kind described, the combination with an engine throttle, an accelerator pedal having overrunning operating connection therewith including a spring through which the throttle is opened, an abutment limiting such throttle movement, an engine cranking device, and means whereby said device is operated by the overrun connection after said spring is overcome.

5. In an automotive engine control system, foot and hand control members both having overrunning connection to the engine throttle, a spring interposed in the connection, a cranking device, and means whereby said device is rendered operable through said connection after said spring is overcome.

6. In an automotive control system, an operator's movable control member, connecting means therefrom to the engine fuel supply whereby the initial movement of said member increases said supply and its continued movement in the same direction decreases it, and another control member having a part adapted for operation by said member by its continued movement.

7. The combination in an automotive engine, of an operator's accelerator device for the normal regulation of the fuel supplied to the engine, operating connections extending from said device, a member in immediate control of the fuel flow to the engine arranged to be moved in one direction by said device and its said connections, a limiting means for limiting such movement, means permitting said operating connections to overrun said member when stopped by said limiting means and an independent device operable by said accelerator device when said operating connections are in overrun position with relation to said member.

8. The combination in an automotive engine, of an operator's accelerator for the normal regulation of the engine fuel supply, operating connections extending from said accelerator, a member in immediate control of the fuel flow to the engine arranged to be moved in an opening direction through said connections by the use of said accelerator, and having a position of maximum fuel supply reached by it in said movement, said operating connections being adapted for a further movement, beyond the position representing said maximum fuel supply and a cranking device engaged by said connections on said further movement thereof.

9. In an automotive control system, an engine throttle, an operator's movable control member, connecting means therefrom to said engine throttle whereby the initial movement of said member turns said throttle to open position and its continued movement in the same direction turns it in the reverse direction, and a starting switch having a part adapted for operation by said member by its continued movement.

10. In an automotive control system, an engine fuel-controlling element having a crank arm, an operator's control element comprising a rod slidingly and pivotally engaged to said crank arm and a stop and spring on said rod establishing a predetermined operating relation of the same to said crank arm.

11. In an automotive engine, an accelerator pedal, operating connections extending from said accelerator, an engine throttle arranged to be moved to a fully opened position through said connections by the depression of said pedal, said pedal and connections having capability of movement beyond the position representing full throttle opening and a cranking device engaged by said connections in their further movement.

JOHN GOOD.